(12) United States Patent
DeCusatis et al.

(10) Patent No.: US 7,821,939 B2
(45) Date of Patent: Oct. 26, 2010

(54) METHOD, SYSTEM, AND COMPUTER PROGRAM PRODUCT FOR ADAPTIVE CONGESTION CONTROL ON VIRTUAL LANES FOR DATA CENTER ETHERNET ARCHITECTURE

(75) Inventors: Casimer DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/861,564

(22) Filed: Sep. 26, 2007

(65) Prior Publication Data

US 2009/0080334 A1 Mar. 26, 2009

(51) Int. Cl.
*H04L 12/26* (2006.01)

(52) U.S. Cl. .............. 370/232; 370/229; 370/230; 370/230.1; 370/231; 370/233; 370/234; 370/235; 370/237

(58) Field of Classification Search ......... 370/229–235, 370/237
See application file for complete search history.

(56) References Cited

U.S. PATENT DOCUMENTS

| 4,779,267 | A | * | 10/1988 | Limb | 370/232 |
|---|---|---|---|---|---|
| 5,901,138 | A | | 5/1999 | Bader et al. | |
| 6,529,518 | B1 | * | 3/2003 | Webber | 370/403 |
| 7,372,814 | B1 | * | 5/2008 | Chiruvolu et al. | 370/235 |
| 2005/0144309 | A1 | | 6/2005 | Gish | |
| 2006/0026295 | A1 | * | 2/2006 | Iwamura | 709/233 |
| 2006/0174023 | A1 | | 8/2006 | Horn et al. | |
| 2008/0037420 | A1 | * | 2/2008 | Tang | 370/229 |
| 2008/0253284 | A1 | * | 10/2008 | Montalvo et al. | 370/230 |

OTHER PUBLICATIONS

Related U.S. Appl. No. 11/426,421, filed Jun. 26, 2006, DeCusatis et al., entitled "Detection of Inconsistent Data Communications Networks".
Proposal for Traffic Differentiation in Ethernet Networks, [online]; [retrieved on Sep. 20, 2007]; retrieved from the Internet, http://www.ieee802.org/1/files/public/docs2005/new-wadekar-virtual%20-links-0305.pdf.

* cited by examiner

*Primary Examiner*—William Trost, IV
*Assistant Examiner*—Toan D Nguyen
(74) *Attorney, Agent, or Firm*—Cantor Colburn LLP; John Campbell (57) ABSTRACT

Congestion is adaptively controlled in a data center Ethernet (DCE) network. Packets are received over at least one virtual lane in the DCE network. An absolute or relative packet arrival rate is computed over a time period. The absolute or relative packet arrival rate is compared to at least a first threshold and a second threshold. If the absolute or relative packet arrival rate increases beyond the first threshold, the packet transmission rate is caused to decrease. If the absolute or relative packet arrival rate is less than a second threshold, the packet transmission rate is caused to increase.

17 Claims, 9 Drawing Sheets

METHOD, SYSTEM, AND COMPUTER PROGRAM PRODUCT FOR ADAPTIVE CONGESTION CONTROL ON VIRTUAL LANES FOR DATA CENTER ETHERNET ARCHITECTURE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

The present invention relates generally to traffic control, and, in particular, to adaptive congestion control.

Figure 1:
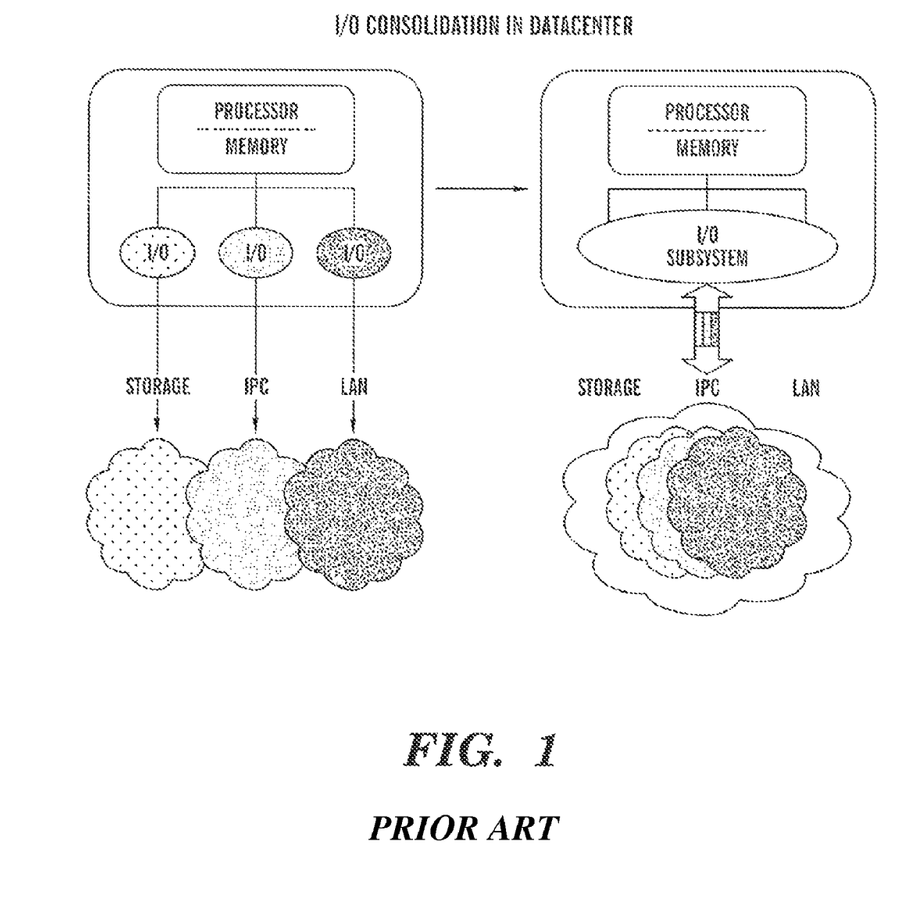
FIG. 1 illustrates proposed consolidation of traffic in a Data Center Ethernet (DCE) network.

Data Center Ethernet (DCE) is an emerging industry standard which proposes modifications to existing networks, in an effort to position Ethernet as the preferred convergence fabric or all types of data center traffic. A recent study has found that Ethernet is the convergence fabric, with I/O consolidation in a Data Center as shown in FIG. 1. This consolidation is expected to simplify platform architecture and reduce overall platform costs. More details of proposals for consolidation are described in "Proposal for Traffic Differentiation in Ethernet Networks," which may be found at http://www.ieee802.org/1/files/public/docs2005/new-wadekar-virtual%20-links-0305.pdf.

Major changes have been proposed for DCE (also referred to as enhanced Ethernet and low latency Ethernet), including the addition of credit based flow control at the link layer, congestion detection and data rate throttling, and the addition of virtual lanes with quality of service differentiation. It is important to note that these functions do not affect Transmission Control Protocol/Internet Protocol (TCP/IP), which exists above the DCE level. It should also be noted that DCE is intended to operate without necessitating the overhead of TCP/IP. This offers a much simpler, low cost approach that does not require offload processing or accelerators.

Implementation of DCE will require a new DC compatible network interface card at the server, storage control unit, and Ethernet switch, most likely capable of 10 Gigabit data rates. There are server related architectural efforts, including low latency Ethernet for high performance servers and encapsulation of various other protocols in a DCE fabric to facilitate migration to a converged DCE network over the next several years. This new architecture for data center networks presents many technical challenges.

Conventional Ethernet networks running under TCP/IP are allowed to drop data packets under certain conditions. These networks are known as "best effort" or lossy networks. Networks using other protocols, such as Asynchronous Transfer Mode (ATM), also use this approach. Such networks rely on dropped packets for detecting congestion. In a network using TCP/IP, the TCP/IP software provides a form of end-to-end flow control for such networks. However, recovery from packet dropping can incur a significant latency penalty. Furthermore, any network resources already used by packets that have been dropped are also wasted. It has been well established that enterprise data center environments require a lossless protocol that don't drop packets unless the packets are corrupted. Also, an enterprise data center environment requires a much faster recovery mechanisms, such as Fiber Channel Protocol, InfiniBand, etc. Lossless networks prevent buffer overflows, offer faster response time to recover corrupted packets, do not suffer from loss-induced throughput limitations and allow burst traffic flow to enter the network without delay, at full bandwidth. It is important to note that these functions do not affect TCP/IP, which is above the DCE level. Some other form of flow control and congestion resolution is needed to address these concerns.

Networks using credit based flow control are subject to congestion "hot spots". This problem is illustrated in FIGS. 2A-2D. The example illustrated in these figures shows a switch fabric with three layers of cascaded switching (switch layer 1, switch layer 2, and switch layer 3) and their associated traffic flows. While three switch layers are shown for simplicity of illustration, it should be appreciated that a switch fabric may contain many more switch layers.

Figure 2A:
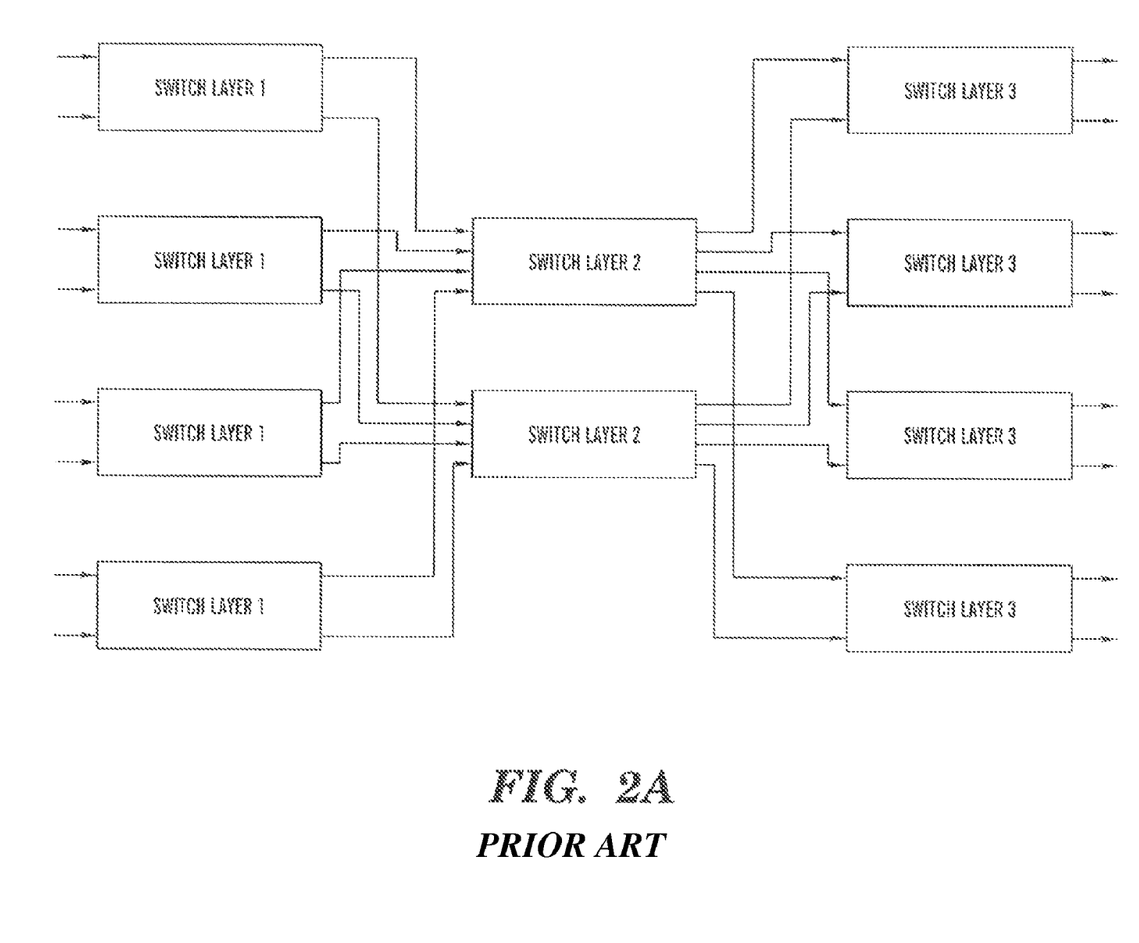
FIGS. 2A-2D illustrate congestion "hot spots" that occur in conventional credit-based flow control networks.
Figure 2B:
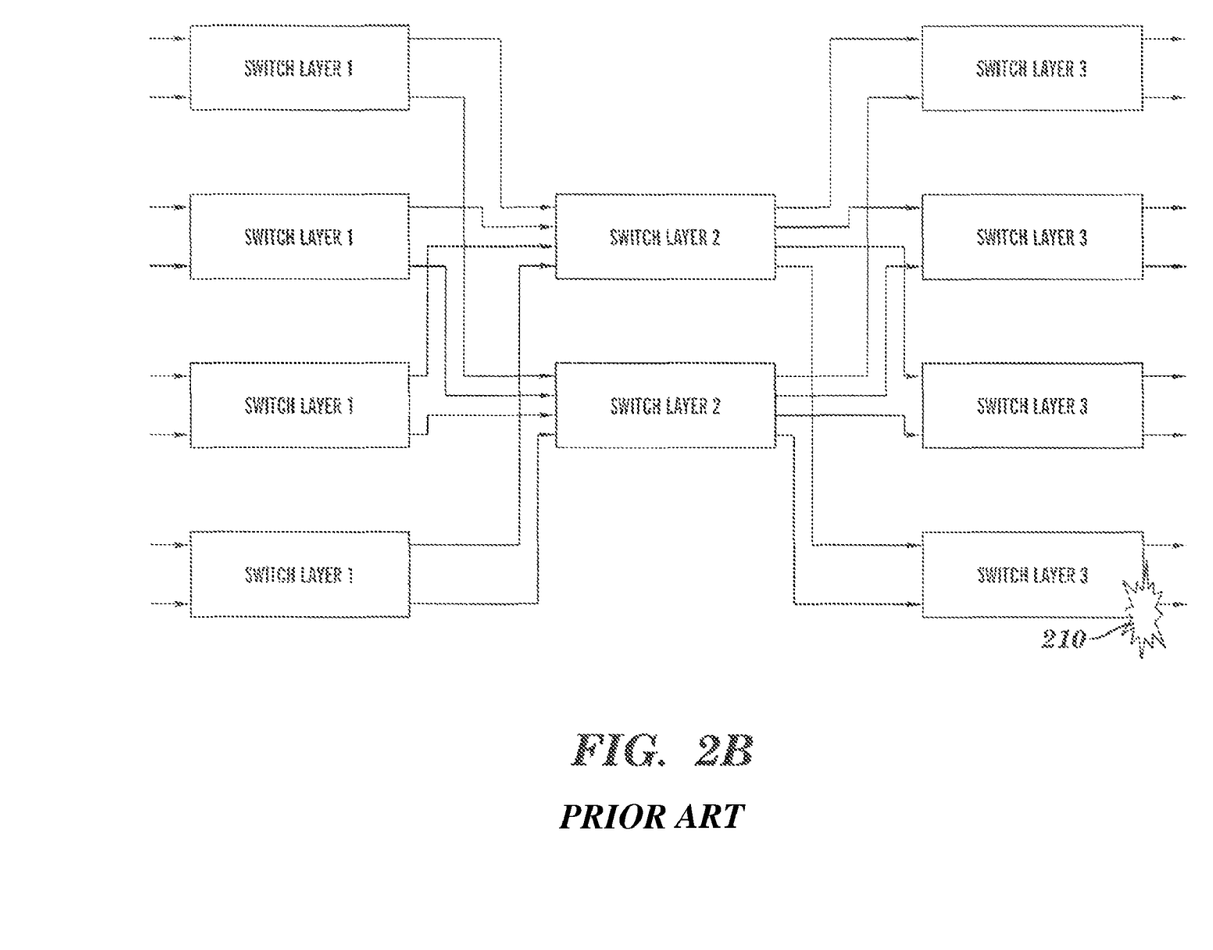
Figure 2C:
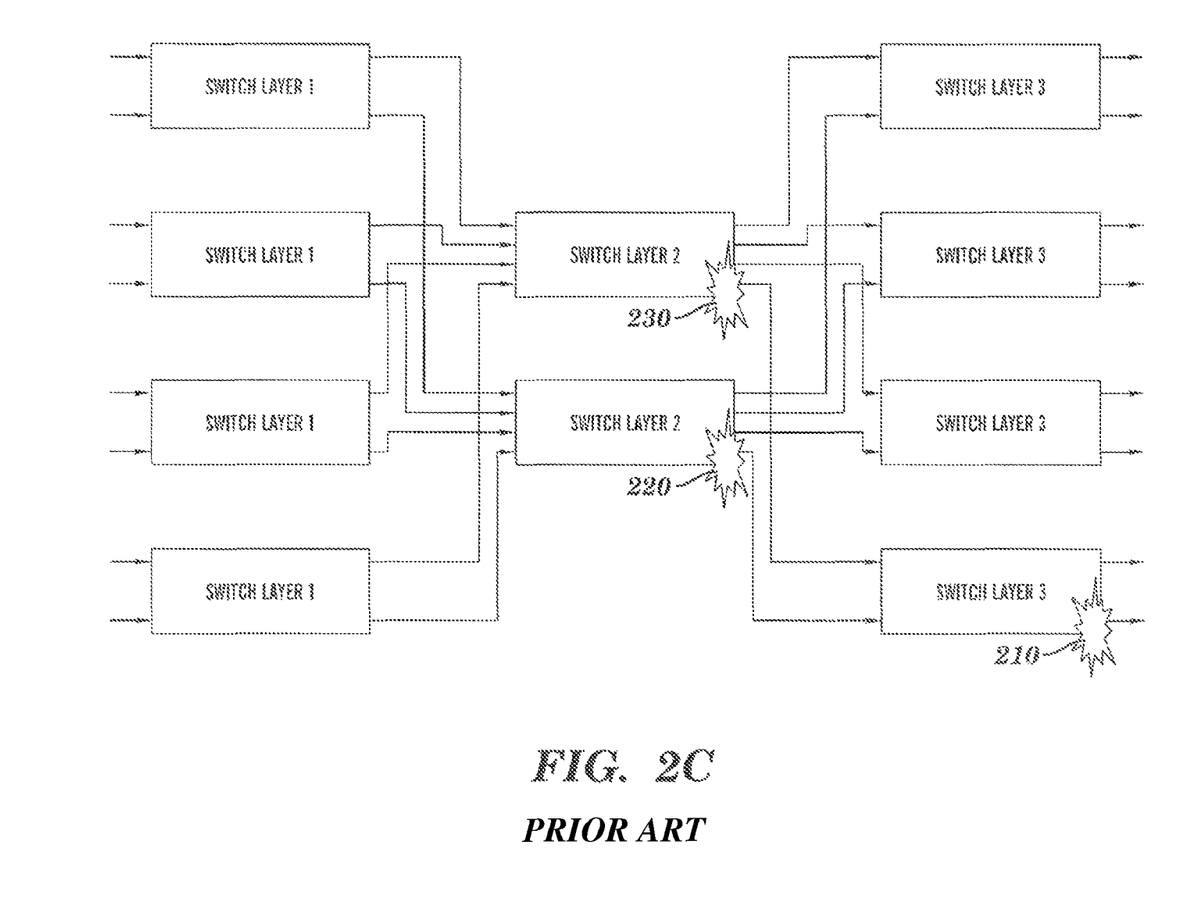
Figure 2D:
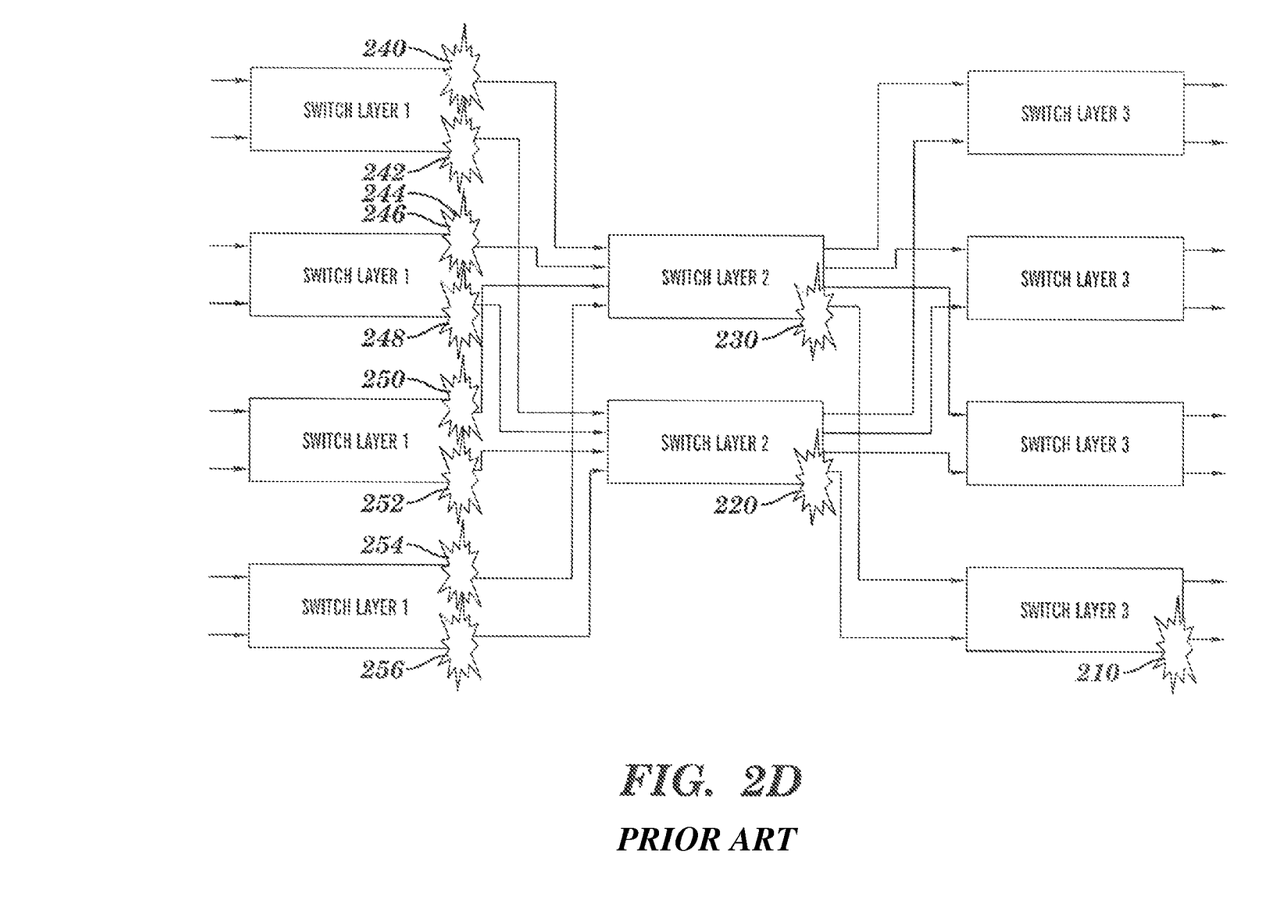

In FIG. 2A, traffic flows smoothly without congestion. However, as shown in FIG. 2B, if a sufficient fraction of all the input traffic targets the same output port, that output link may saturate, forming a "hot spot" 210. This causes the queues on the switches feeding the link to fill tip. If the traffic pattern persists, available buffer space on the switches may be exhausted. This, in turn, may cause the previous stage of switching to saturate its buffer space, forming additional hot spots 220 and 230 as shown in FIG. 2C. The congestion eventually may back up all the way to the network input nodes, forming hot spots 240-256. This is referred to as congestion spread or tree saturation. One or more saturation trees may develop at the same time and spread through the network very quickly. In a fully formed saturate tree, every packet must cross at least one saturated switch on its way through the network. The network, as a whole, can suffer a catastrophic loss of throughput as a result.

There have been several proposed solutions to this problem. One proposed solution involves detecting potential buffer overflow condition at the switch and broadcasting a message downstream to the destination, then back to the source, requesting that the data rate be throttled back. This approach takes time. Also, it relies on a preset threshold in the switch for detecting when a buffer is nearing saturation. Bursts of traffic may cause the switch to exceed its threshold level quickly and to die down again just as quickly. A single threshold based on traffic volume is unable to compensate fast enough under these conditions.

Many other conventional schemes require some a priori knowledge of where the congestion point is located. These schemes only work well for traffic patterns that are predictable and are not suited for mixed traffic having unpredictable traffic patterns.

Another common workaround involves allocating excess bandwidth or over-provisioning the network to avoid hotspot formation. However, over-provisioning does not scale well as the number of network nodes increases and is an expensive solution as data rates approach 10 Gbit/s. Furthermore, DCE is intended to mix different data traffic patterns (voice, storage, streaming video, ad other enterprise data) onto a single network. This makes it much more likely that DCE will encounter hotspot congestion, since the traffic pattern is less predictable.

SUMMARY

According to an exemplary embodiment, a method, system, and computer program product are provided for adaptive congestion control in a Data Center Ethernet (DCE) network. Packets are received over at least one virtual lane in the DCE network. An absolute or relative packet arrival rate is computed over a time period. The absolute or relative packet arrival rate is compared to at least a first threshold and a second threshold. If the absolute or relative packet arrival rate exceeds the first threshold, the packet transmission rate is caused to decrease. If the absolute or relative packet arrival rate is less than a second threshold, the packet transmission rate is caused to increase.

BRIEF DESCRIPTION OF THE DRAWINGS

Referring to the exemplary drawings, wherein like elements are numbered alike in the several Figures.

DETAILED DESCRIPTION

According to an exemplary embodiment, reliability at the link layer in a large Data Center Ethernet (DCE) network is enhanced. In one embodiment, the packet arrival rate is dynamically computed and compared to thresholds, instead of simply counting the total number of accumulated packets in a switch buffer. This allows a potential congestion condition to be more quickly detected and to be responded to as appropriate. In cases where the congestion builds up slowly, this approach may also wait until it becomes necessary to throttle back the packet transmission rate. This approach also allows recovery to be performed more quickly after the congestion has passed, and the links are throttled back up to their full operating rates.

According to an exemplary embodiment, in order to prevent dropped packets, each packet is assigned a packet sequence number (PSN). In one embodiment, the PSN may include 24 bits reserved in the packet header with an optional 3 bit session identifier. Schemes to assign these numbers and to re-initialize the sequence of valid PSNs when a link is re-established are described, e.g., in commonly assigned U.S. patent application Ser. No. 11/426,421, herein incorporated by reference.

Figure 3:
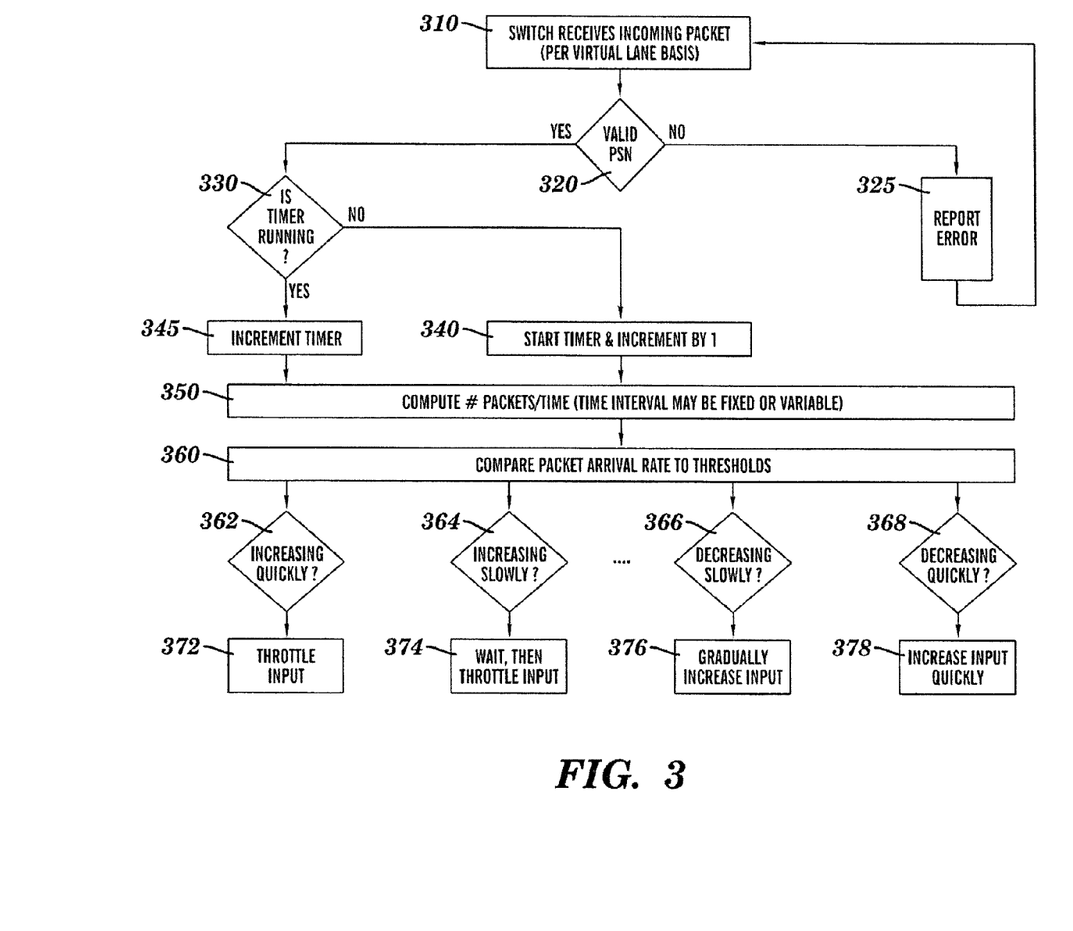
FIG. 3 illustrates a method for adaptive congestion control according to an exemplary embodiment.

FIG. 3 illustrates a method for adaptive congestion control in a DCE network according to an exemplary embodiment. A packet is received at a switch over a virtual lane at step 310. A determination is made wither the packet has a valid PSN at step 320. This determination may be made, e.g., in a switch (Such as the switch 510a shown in FIG. 5). If the packet does not bear a valid PSN, an error is generated at step 325, and the process returns to step 310. If the packet does bear a valid PSN, a determination is made whether a counter timer is running at step 330. If not, a counter timer is started and incremented by one at step 340. If a counter timer is running, it is incremented by one at step 345. The counter timer is incremented when each successive packet bearing a valid PSN arrives. At step 350, the absolute packet arrival rate is computed. There is no need to check for sequential PSNs at this point, since only the packet arrival rate is being measured. The absolute packet arrival rate may be computed over a fixed interval of time or a variable length time window. The absolute packet arrival rate is compared to various thresholds at steps 360-368. This comparison may be performed in the switch. If the absolute packet arrival rate is determined at step 362 to exceed a threshold level indicating that the packet arrival rate is increasing quickly, a message is sent, e.g., from the switch, to a source node (e.g., the source node 520 shown in FIG. 5) to throttle down the packet transmission rate at step 372. If the absolute packet arrival rate is determined at step 364 to exceed a lower threshold, indicating that the packet arrival rate is increasing slowly, the input may be throttled down alter waiting a predetermined amount of time at step 374. The process may also be reversed, so that if the absolute packet arrival rate is determined to be less than a predetermined threshold at step 366, indicating that the packet arrival rate is decreasing slowly, a command can be sent to the source node to increase the packet transmission rate after a predetermined amount of time at step 376. If the absolute packet arrival rate is determined to be less than a lower threshold at step 368, indicating that the packet arrival rate is decreasing quickly, the source node may be caused to increase the packet transmission rate quickly at step 378.

Figure 4A:
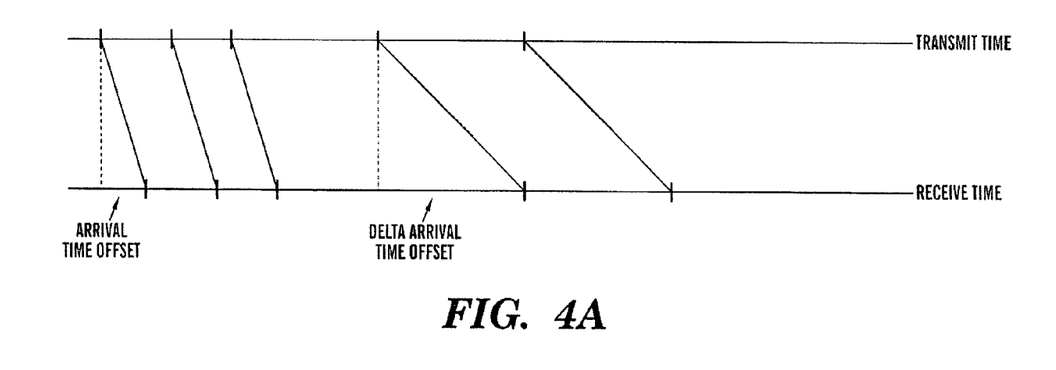
FIG. 4A illustrates a change in offsets between transmission of packets and receipt of packets.

According to another embodiment, time stamping of DCE packet headers may be used instead of a counter to determine a relative packet arrival rate for use in comparison with thresholds. FIG. 4A illustrates how there may be changes (delta) in the offset from the time a packet is transmitted until it is received over time for various packets. The offset between packet transmission times and packet receipt times may be measured over a period of time and used as an indication of a relative packet transmission rate. The offset may be measured by detecting a time stamp put on a packet header at the time of transmission (e.g., from a switch) indicating a time of transmission of the packet and determining a time at which the packet is received (e.g., at another switch). The offset is the difference in time between the time of transmission and the time of receipt. To account for latency, the time stamp may be put on the header of the packet as it exits a node, e.g., a switch. Changes in the offset may indicate whether the packet arrival rate is increasing or decreasing over a period of time. The relative packet arrival rate may be computed based on the offsets between packet transmission times and packet arrival times, and measures may be taken to cause the packet arrival rate to increase or decrease by comparing the computed relative packet arrival rate to various thresholds as explained below with reference to FIG. 4B. This allows a centralized manager within the network to determine congestion points or whether the source packet injection rate is just slow. This embodiment does not require synchronization of receive and transmit clocks anywhere in the network (including the source, destination and internal nodes and switches), as only offsets between transmission and arrival times are used to compute a relative packet arrival rate. Thus, it is possible that the offset in time between transmission of a packet and receipt of a packet may be a negative value.

Figure 4B:
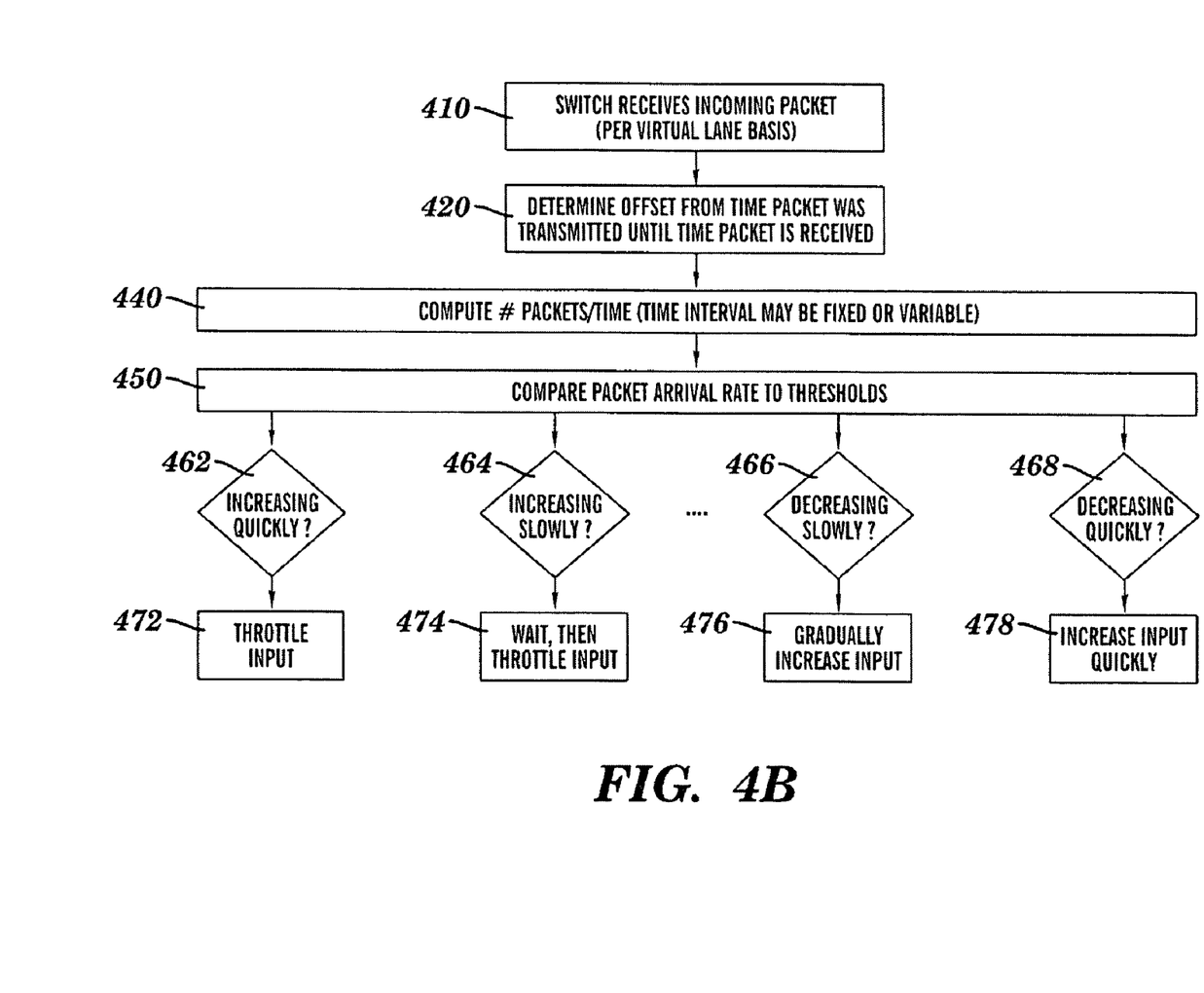
FIG. 4B illustrates a method for adaptive congestion control according to another embodiment.

FIG. 4B illustrates a method for adaptive congestion control in a DCE network using a time stamp approach according to an exemplary embodiment. A packet is received at a switch over a virtual lane at step 410. An offset from the time the packet was transmitted and the time the packet is received is determined at step 420 as described above. At step 440, the relative packet arrival rate is computed based on the offsets between transmission times and arrival times for a number of packets over a period of time. The relative packet arrival rate may be computed over a fixed interval of time or a variable length time window. Similar to the process shown in FIG. 3, the relative packet arrival rate is compared to various thresholds at steps 460-468. This comparison may be performed in the switch. If the relative packet arrival rate is determined at step 462 to exceed a threshold level indicating that the packet arrival rate is increasing quickly, a message is sent a source node (e.g., the source node 520 shown in FIG. 5) to throttle down the packet transmission rate at step 472. If the relative packet arrival rate is determined at step 464 to exceed a lower threshold, indicating that the relative packet arrival rate is increasing slowly, the input may be throttled down after waiting a predetermined amount of time at step 474. The process may also be reversed, so that if the relative packet arrival rate is determined to be less than a predetermined threshold at step 466, indicating that the packet arrival rate is decreasing slowly, a command can be sent to the source node to increase the packet transmission rate after a predetermined amount of time at step 476. If the relative packet arrival rate is determined to be less than a lower threshold at step 468, indicating that the relative packet arrival rate is decreasing quickly, the source node may be caused to increase the packet transmission rate quickly at step 478.

According to an exemplary embodiment, the processes depicted in FIGS. 3 and 4B may be implemented in a switch by control logic and/or a computer processor performing instructions encoded on a computer readable medium, such as CD-ROM disks or floppy disks, included in a computer program product.

The approaches described above may be implemented on every node in a network at each switch. In this way, bursts of traffic that are a potential cause of congestion may be responded too more quickly. Also, recovery may be performed more quickly when the congestion passes.

Figure 5:
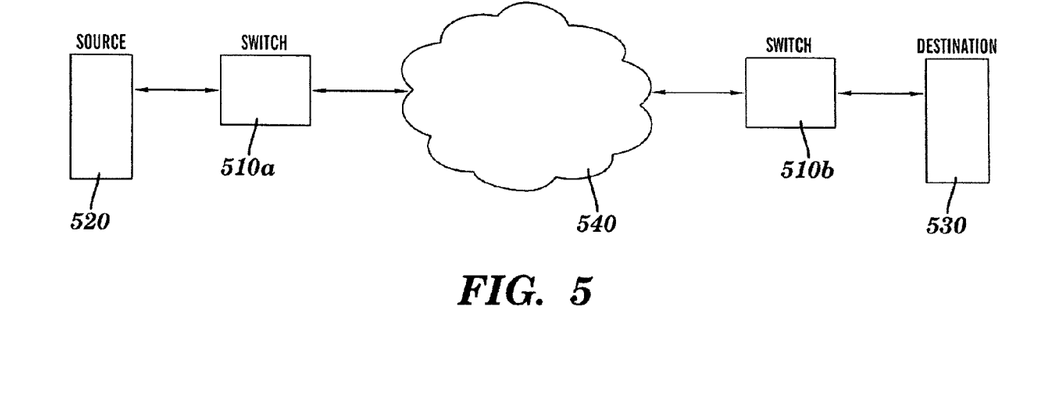
FIG. 5 illustrates an exemplary system for adaptive congestion control according to an exemplary embodiment.

FIG. 5 illustrates an exemplary system for adaptive congestion control according to an exemplary embodiment. As shown in FIG. 5, packets are transmitted between a source node 520 and a destination node 530 via switches 510a and 510b and a DCE fabric of links 540. Although two switches are shown in FIG. 5 for simplicity of illustration, it should be appreciated that there may be many more switches. Packet arrival rates may be measured/computed and compared with thresholds in the switches 510a and 510b, as described above. The switches, in turn, may cause the source node (or the destination node, if traffic is being sent from the destination node) to increase/decrease the packet transmission rate as needed.

As described above, different threshold levels may be set for different rates of traffic increase/decrease. If the traffic transmission rate is increased slowly, for example, there may be a pause before requesting that the source throttle down the input data rate. Similarly, if traffic transmission rate is decreased slowly, there may be a pause before requesting the source to throttle up the input data rate. In this way, the maximum amount of data is kept in the pipeline for a long as possible, making more efficient use of the available network bandwidth. The maximum allowed receive buffer allocation may be adjusted, depending on the packet arrival rate and thresholds. Also, according to exemplary embodiments, faster recovery from congestion conditions may be achieved in comparison to simply measuring the total number of packets. This enables proactive prevention of formation of congestion trees and optimizes network throughput and efficiency.

Further, this approach may be implemented on a per-lane basis system that transmits several virtual traffic flows across a common high speed connection. In this way, a burst of traffic on one virtual lane will not cause congestion for other traffic streams that share the same physical connection. This load balancing is particularly beneficial for mixed traffic types. Also, the allocation of the receive buffer size may be adjusted based on increases and decreases in packet arrival rates. It is even possible to implement a feedback loop for dynamically allocating traffic among different virtual lanes depending on the level of congestion.

As noted above, the processes depicted in FIGS. 3 and 4B may be implemented in a switch by control logic and/or a computer processor performing instructions encoded on a computer readable medium, such as CD-ROM disks or floppy disks, included in a computer program product. An exemplary system for implementing the processes on a computer program product is shown in FIG. 6.

Figure 6:
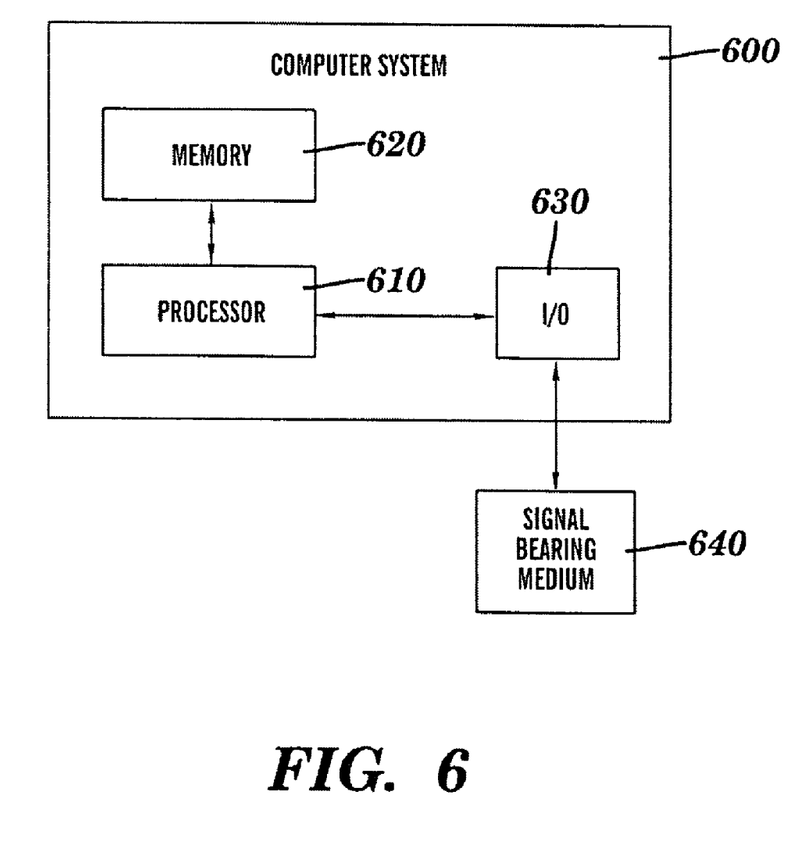
FIG. 6 illustrates an exemplary system for implementing adaptive congestion control using a computer program product according to exemplary embodiments.

FIG. 6 illustrates an exemplary system for implementing adaptive congestion control using a computer program product according to exemplary embodiments. The system includes a computer 600 in contact with a signal bearing medium 640 via an input/output interface 630. The signal bearing medium 640 may include instructions for performing the adaptive congestion control techniques described above implemented as, e.g., information permanently stored on non-writable storage media (e.g., read-only memory devices within a computer, such as CD-ROM disks readable by a CD-ROM drive), alterable information stored on a writeable storage media (e.g., floppy disks within a diskette drive or hard-disk drive), information conveyed to a computer by a communications medium, such as through a computer or telephone network, including wireless and broadband communications networks, such as the Internet, etc.

The computer includes a processor 610 that executes the instructions for performing the adaptive congestion control technique contained, e.g., on the signal bearing medium 640 and communicated to the computer via the input/output interface 630. The instructions for performing adaptive congestion control may be stored in a memory 620 or may be retained on the signal bearing medium 640.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for adaptive congestion control in a Data Center Ethernet (DCE) network, comprising:
   receiving packets at a receive buffer over at least one virtual lane in the DCE network;
   computing an absolute or a relative packet arrival rate over a time period;
   adjusting the receive buffer size in response to computing the absolute or relative packet arrival rate;
   comparing the absolute or relative packet arrival rate to at least a first threshold, a second threshold and a third threshold;
   issuing a command to decrease the packet transmission rate in response to determining that the absolute or relative packet arrival rate exceeds the first threshold; and
   issuing a command to increase the packet transmission rate in response to determining that the absolute or relative packet arrival rate is less than the second threshold; and
   issuing a command to decrease the packet transmission rate after waiting a period of time in response to determining that the absolute or relative packet arrival rate exceeds the third threshold but is less than the first threshold.

2. The method of claim 1, wherein the absolute arrival rate is computed by:
   determining whether each received packet has a valid packet sequence number; and
   in response to determining that the received packet has a valid packet sequence number, incrementing a counter, wherein the absolute packet arrival rate is computed based on increments in the counter over the time period.

3. The method of claim 1, wherein the relative packet arrival rate is computed by:
  detecting a timestamp of each received packet indicating a time when the packet was transmitted; and
  determining an offset from a time of receipt of the packet and the time when the packet was transmitted, wherein the relative packet arrival rate is computed based on offsets in receipt of packets over the time period.

4. The method of claim 1, wherein the absolute or relative packet arrival rate is computed over a fixed time period or a variable time period.

5. The method of claim 1, further comprising:
  comparing the absolute or relative packet arrival rate to a fourth threshold; and
  issuing a command to increase the packet transmission rate after waiting a period of time in response to determining that the absolute or relative packet arrival rate is less than the fourth threshold but is not less than the second threshold.

6. The method of claim 1, wherein the steps are performed for packets on a per-virtual-lane-basis.

7. The method of claim 1, further comprising dynamically increasing or decreasing packet transmission rates on other virtual lanes depending on the computed packet arrival rate on the at least one virtual lane.

8. A system for adaptive congestion control in a Data Center Ethernet (DCE) network, comprising:
  a transmitter for transmitting packets over at least one virtual lane in the DCE network;
  a receiver for receiving the transmitted packets from the transmitter at a receive buffer; and
  a switch interspersed between the transmitter and the receiver, wherein the switch receives the packets from the transmitter and computes an absolute or a relative packet arrival rate over a time period, adjusts the receive buffer size in response to computing the absolute or relative packet arrival rate, and compares the absolute or relative packet arrival rate to at least a first threshold, a second threshold and a third threshold, wherein the switch issues a command to decrease the packet transmission rate in response to determining that the absolute or relative packet arrival rate exceeds the first threshold, and issues a command to increase the packet transmission rate in response to determining that the absolute or relative packet arrival rate is less than the second threshold; and
  issuing a command to decrease the packet transmission rate after waiting a period of time in response to determining that the absolute or relative packet arrival rate exceeds the third threshold but is less than the first threshold.

9. The system of claim 8, wherein the switch further determines whether each received packet has a valid packet sequence number, and in response to determining that the received packet has a valid packet sequence number, the switch increments a counter, wherein the switch computes the absolute packet arrival rate based on increments in the counter over the time period.

10. The system of claim 8, wherein the switch detects a timestamp of each received packet indicating a time when the packet was transmitted and determines an offset from a time of receipt of the packet and the time when the packet was transmitted, wherein the step of computing the relative packet arrival rate is based on offsets in receipt of packets over the time period.

11. The system of claim 8, wherein the absolute or relative packet arrival rate is computed over a fixed time period or a variable time period.

12. The system of claim 8, wherein the switch further compares the absolute or relative packet arrival rate to a fourth threshold, and issues a command to increase the packet transmission rate after waiting a period of time in response to determining that the absolute or relative packet arrival rate is less than the fourth threshold but is not less than the second threshold.

13. A non-transitory computer program product for adaptive congestion control in a Data Center Ethernet network, comprising a computer usable medium having a computer readable program, wherein the computer readable program, when executed on a computer, causes the computer to:
  compute an absolute or a relative packet arrival rate over a time period for packets received at a receive buffer;
  adjusting the receive buffer size in response to computing the absolute or relative packet arrival rate;
  compare the absolute or relative packet arrival rate to at least a first threshold, a second threshold and a third threshold,
  issue a command to decrease the packet transmission rate in response to determining that the absolute or relative packet arrival rate exceeds the first threshold; and
  issue a command to increase the packet transmission rate in response to determining that the absolute or relative packet arrival rate is less than the second threshold, cause the packet transmission rate to increase; and
  issuing a command to decrease the packet transmission rate after waiting a period of time in response to determining that the absolute or relative packet arrival rate exceeds the third threshold but is less than the first threshold.

14. The non-transitory computer program product of claim 13, wherein the absolute arrival rate is computed by:
  determining whether each received packet has a valid packet sequence number; and
  in response to determining that the received packet has a valid packet sequence number, incrementing a counter, wherein the absolute packet arrival rate is computed based on increments in the counter over the time period.

15. The non-transitory computer program product of claim 13, wherein the relative packet arrival rate is computed by:
  detecting a timestamp of each received packet indicating a time when the packet was transmitted; and
  determining an offset from a time of receipt of the packet and the time when the packet was transmitted, wherein the relative packet arrival rate is computed based on offsets in receipt of packets over the time period.

16. The non-transitory computer program product of claim 13, wherein the absolute or relative packet arrival rate is computed over a fixed time period or a variable time period.

17. The non-transitory computer program product of claim 13, wherein the computer readable medium further includes instructions that, when executed on a computer, cause the computer to:
  compare the absolute or relative packet arrival rate to a fourth threshold; and
  issuing a command to increase the packet transmission rate after waiting a period of time in response to determining that the absolute or relative packet arrival rate is less than the fourth threshold but is not less than the second threshold.

* * * * *